United States Patent [19]

Carlson

[11] 4,029,291

[45] June 14, 1977

[54] LOCKING-TYPE GAS VALVE

[75] Inventor: Everett W. Carlson, Detroit, Mich.

[73] Assignee: Lincoln Brass Works, Inc., Detroit, Mich.

[22] Filed: Apr. 2, 1976

[21] Appl. No.: 673,098

[52] U.S. Cl. .................................................. 251/96
[51] Int. Cl.² ....................................... F16K 35/02
[58] Field of Search .................. 251/89, 90, 92, 93, 251/95, 96, 97, 100, 101

[56] References Cited

UNITED STATES PATENTS

| 1,953,776 | 4/1934 | Roberts | 251/96 |
| 2,035,762 | 3/1936 | Roberts | 251/96 |
| 2,194,714 | 3/1940 | Mueller | 251/96 |
| 2,243,128 | 5/1941 | Rutherford | 251/96 |
| 2,262,703 | 11/1941 | Stuckenholt | 251/95 |
| 3,010,693 | 11/1961 | Lamar | 251/96 |
| 3,292,660 | 12/1966 | Zarybnicky | 251/96 |
| 3,764,102 | 10/1973 | Shopsky | 251/96 |

Primary Examiner—Martin P. Schwadron
Assistant Examiner—G. L. Walton
Attorney, Agent, or Firm—Barnes, Kisselle, Raisch & Choate

[57] ABSTRACT

In a locking-type gas valve having a plug rotatable by a stem having a portion which is pushed axially inwardly against a spring bias to disengage a projection thereon from a locking recess in a cap on the valve body, improved structure wherein the cap comprises a single flat plate having a slot therethrough forming the locking recess, the slot being adjacent a screw which secures the cap on the valve body and the screw having a washer which overlies the slot and retains the projection within the cap against the spring bias acting on the stem.

10 Claims, 5 Drawing Figures

U.S. Patent   June 14, 1977   4,029,291
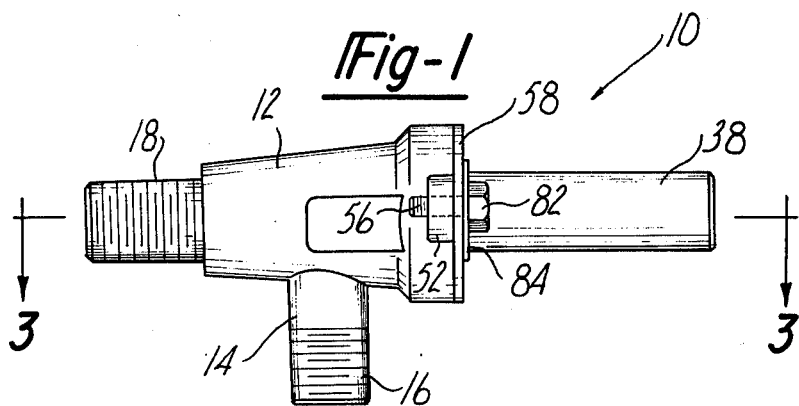
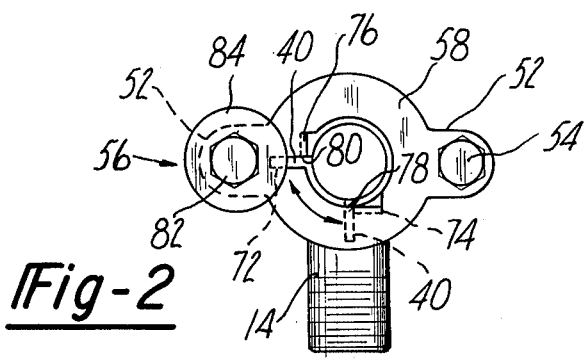
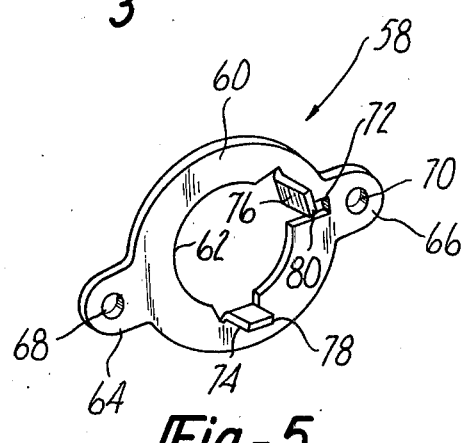
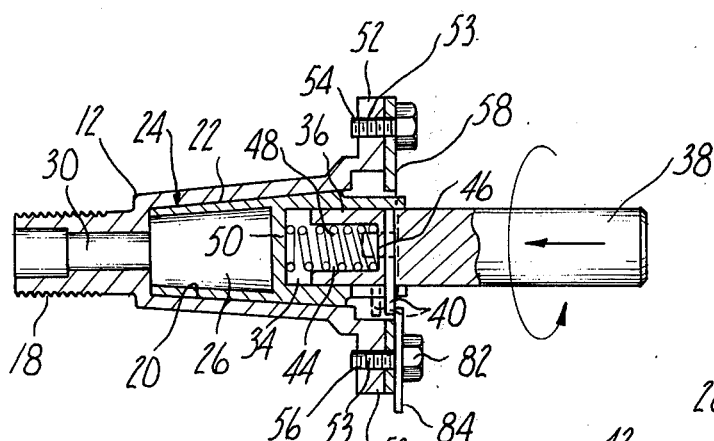
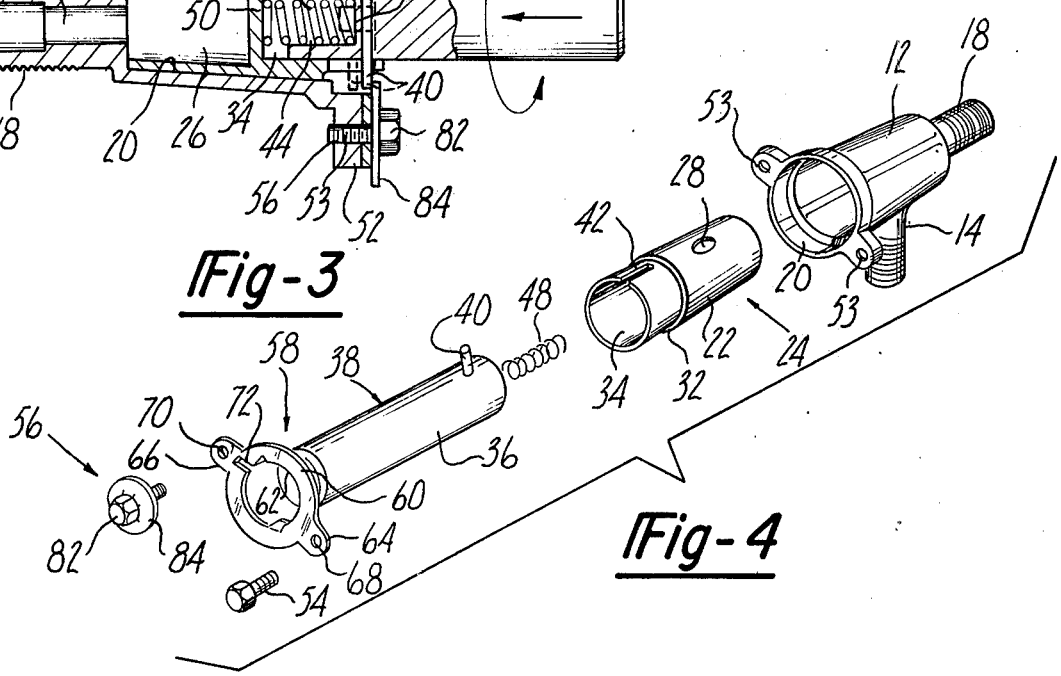

LOCKING-TYPE GAS VALVE

This invention relates to gas valves of the type used in domestic cooking ranges and the like and, more particularly, to a locking valve wherein the operating stem must be pushed axially inwardly to unlock it for rotation from off position to an on position.

In a typical locking valve, the operating stem is spring biased axially outwardly so that a radial projection thereon snaps outwardly into a locking recess in the cap structure of the valve when the valve is turned from an on position to off position. In one conventional valve of this type, the cap comprises a single element in which the locking recess is formed by stamping, the stamped element being relatively expensive. In another conventional valve of this type, the single cap element is replaced by a pair of flat plates in laminar relation, the inner plate having a slot therein which forms the locking recess. This cap structure is less expensive than the single stamped cap element but still is more expensive than is desirable.

The object of the present invention is to provide a locking valve having a cap structure which is very simple and improved to facilitate more economical manufacture than is possible in valves having conventional caps. One form of the invention is shown in the accompanying drawings in which:

FIG. 1 is a side elevational view of a valve embodying the present invention.

FIG. 2 is an end elevational view of the valve.

FIG. 3 is a generally sectional view on line 3—3 of FIG. 1.

FIG. 4 is an exploded perspective view of the components of the valve with the valve plug and operating stem rotated clockwise about 90° out of position to illustrate structural detail.

FIG. 5 is an enlarged scale perspective view of the valve cap taken separately.

Shown in the drawings is a valve 10 according to the present invention having a body 12 with an inlet nipple 14 threaded at 16 for coupling with a source of fuel gas, body 12 having an outlet nipple 18 threaded to receive a conventional hood (not shown) having an outlet orifice therein. Body 12 has a conical interior surface 20 against which the conical exterior surface 22 of a valve plug 24 rotatably seats. Plug 24 has an internal gas way 26 which communicates with exterior surface 22 through a port 28 and which opens downstream into an outlet passageway 30 in nipple 18. The valve is turned on and off by rotating plug 24 to carry port 28 into and out of registry with inlet 14.

Plug 24 has an axial extension 32 formed with an internal cylindrical socket 34 which axially slidably receives an axially inward end portion 36 of an operating stem 38. Stem portion 36 has a radially outwardly projecting pin 40 which fits axially slidably in a slot 42 in plug extension 32 to provide a rotating drive connection betweem the stem and plug. Stem portion 36 has an axial recess 44 with an end wall 46. A coil spring 48 within recess 44 is compressed between end wall 46 and the inner wall 50 of socket 34. Spring 48 urges plug surface 22 into engagement against internal surface 20 of body 12 and urges stem 38 axially outwardly. Valve body 12 is provided with a pair of lugs 52, each having a threaded opening 53 therein, one for receiving a screw 54 and the other for receiving a screw 56 by which a cap 58 according to the present invention is secured onto the valve body.

Cap 58, in essence, is a substantially flat plate having a ring-shaped portion 60 which defines a generally circular central opening 62 through which extension 32 of plug 24 extends. Projecting from opposite sides of ring 60 are two mounting tabs 64, 66 with openings 68, 70, respectively, through which screws 54, 56 pass for threading into openings 53. A slot 72 extends from central opening 62 in ring 60 radially outwardly to a location adjacent opening 70. Two axially extending fingers 74, 76 are struck up from plate 58 and have edges 78, 80 which, respectively, form stops for engagement by pin 40 on stem 38 at on and off positions of valve 10. In the off position of the valve, pin 40 is rotationally aligned with slot 72, and spring 48 urges the pin axially into the slot. Screw 56 has a head 82 beneath which is a washer 84 diametered to overlie at least a portion of slot 72 (FIGS. 2 and 3) occupied by pin 40 so that the washer retains the pin against being forced outwardly of cap 58 through slot 72 by spring 48.

In use, it will be assumed that the parts have been assembled as described and that valve 10 is in the off position shown in solid lines in FIGS. 2 and 3 with pin 40 engaged in slot 72 and against the underside of washer 84. In this position of the parts, engagement of the pin within the slot prevents rotation of operating stem 38, and plug 24 cannot be turned from its off position toward an on position. To turn the valve on, stem 38 is pushed axially inwardly, or to the left as the drawings are viewed, to disengage pin 40 from slot 72, and then the stem is turned counterclockwise through about 90° to bring port 28 into registry with inlet 14. At this position pin 40 engages stop 78 on finger 74. To return the valve to off position, stem 38 and plug 24 are rotated clockwise through about 90° until pin 40 engages stop 80. Pin 40 is now aligned with slot 72, and spring 48 snaps the pin into the slot, thereby again locking the valve in off position.

In the form of the invention illustrated, screw 56 and washer 84 are integral, the washer forming a part of screw head 82. Such washer head screws are commercially available as off-the-shelf items. While it may be preferable in practice of the invention to use washer head screws, it is also within the invention to use separate screws 56 and washers 84.

I claim:

1. In a gas valve having a body with a plug rotatable therein between off and on positions, the plug having an operating stem shiftable axially thereon to disengage a projection on said stem from an opening in a cap on said body against a spring bias to facilitate rotation of the plug from off to on position, improved structure wherein, said cap is secured to said body at least in part by a screw, said opening being disposed adjacent said screw, and washer means on said screw overlying at least a portion of said opening and forming an obstruction to axial movement of said projection through said opening beyond said cap under said spring bias.

2. The structure defined in claim 1 wherein said cap has the form of a single substantially flat plate.

3. The structure defined in claim 2 wherein said cap has a central opening through which said stem projects and another opening through which said screw extends for attachment to said body, the first said opening extending radially from said central opening toward said other opening.

4. The structure defined in claim 3 wherein said cap has an axially extending portion adjacent the first said opening engageable by said projection when the latter is rotated toward off position into alignment with the first said opening.

5. The structure defined in claim 4 wherein said cap has another axially extending portion angularly distal of the first said axially extending portion engageable by said projection when the latter is rotated to an on position of said valve.

6. The structure defined in claim 5 wherein said cap has generally the form of a ring two laterally outwardly mounting tabs, one of which has said other opening and the second of which has an opening through which a second screw extends for securing said cap to said body.

7. The structure defined in claim 1 wherein said screw and washer means are integral, said screw having a head formed in part by said washer means.

8. The structure defined in claim 3 wherein said screw and washer means are integral, said screw having a head formed in part by said washer means.

9. The structure defined in claim 6 wherein said screw and washer means are integral, said screw having a head formed in part by said washer means.

10. The structure defined in claim 1 wherein said screw and washer means are separate elements, said screw having a head securing said washer element over said portion of said opening.

* * * * *